United States Patent [19]

Sugama et al.

[11] Patent Number: 4,712,759
[45] Date of Patent: Dec. 15, 1987

[54] LOCK STRUCTURE FOR SEAT SLIDE DEVICE

[75] Inventors: Takayuki Sugama; Hiroshi Tabata; Tadanori Honda, all of Tochigi, Japan

[73] Assignee: Honda Giken Kogyo Kabushiki Kaisha, Tokyo, Japan

[21] Appl. No.: 858,400

[22] Filed: May 1, 1986

[30] Foreign Application Priority Data

May 11, 1985 [JP] Japan .................. 60-100068
May 11, 1985 [JP] Japan .................. 60-100069

[51] Int. Cl.4 ......................................... F10M 13/00
[52] U.S. Cl. .................................. 248/429; 74/535
[58] Field of Search ............... 248/429, 430, 393, 419, 248/420, 424; 297/344; 74/141.5, 533, 534, 535, 536, 537

[56] References Cited

U.S. PATENT DOCUMENTS

| | | | |
|---|---|---|---|
| 2,066,557 | 1/1937 | Cox | 248/424 UX |
| 2,951,527 | 9/1960 | Wassilieff | 297/344 |
| 4,189,957 | 2/1980 | Gedig | 74/535 |
| 4,238,099 | 12/1980 | Hunwicks | 248/430 |
| 4,378,927 | 4/1983 | Graves | 248/430 X |
| 4,384,701 | 5/1983 | Barley | 248/430 X |
| 4,483,504 | 11/1984 | Duinelshoft | 248/429 |

FOREIGN PATENT DOCUMENTS 2713973 10/1978 Fed. Rep. of Germany ...... 248/429
2237449 2/1975 France .................. 248/424

Primary Examiner—J. Franklin Foss
Attorney, Agent, or Firm—Lyon & Lyon

[57] ABSTRACT

A lock structure for a seat slide device for a vehicle seat having a first and a second rail which are parallel to each other and mutually slidable, and in particular to such a lock device which can lock up at any slide position. This can be accomplished by varying the pitch of the lock holes and the lock teeth from each other as opposed to the case of conventional lock structures in which lock teeth and lock holes are provided at the same pitch. The various approaches proposed by the present application include the use of the principle of a vernier caliper, varying the phase relationship of the lock teeth relative to the lock holes, and using evenly spaced lock teeth in combination with lock holes provided at a pitch which is a multiple of the pitch of the lock teeth. Since the seat slide device can lock up at any arbitrary slide position, not only the adjustment of seat slide position is facilitated but also secure locking will be assured when it is used in a slave seat slide device which is to be actuated at the same time as a master seat device without unduly increasing the rigidity of the general seat support structure.

7 Claims, 38 Drawing Figures

LOCK STRUCTURE FOR SEAT SLIDE DEVICE

TECHNICAL FIELD

This invention relates to a lock structure for a seat slide device having a first and a second rail which are parallel to each other and mutually slidable, and in particular to such a lock device which can lock up at any slide position.

PRIOR ART

For adjusting the position of a vehicle seat along the longitudinal direction of the vehicle body and securing the seat at the adjusted position, various seat slide devices equipped with various forms of lock structures have been proposed. Typically, a lock structures for such a seat slide device comprises a plurality of lock holes provided in the first rail along the longitudinal axial line thereof at an equal interval and lock teeth which are hinged to the second rail so as to be selectably engageable to the lock holes. One of such lock structures is proposed, for instance, in copending U.S. patent application Ser. No. 790,036 filed on Oct. 22, 1985.

However, such a lock structure can accomplish a secure locking only when the lock teeth have aligned with the lock holes with a certain tolerance arising from the tapering of the lock teeth since a lock up is impossible if the lock teeth are located between neighboring lock holes. And the tapering can not be increased indefinitely since a secure engagement will be impossible if the tapering is excessive. Therefore, when a seat slide device is to be locked up again after moving the seat to and fro, it is necessary in most cases to slightly move the seat to and fro to allow the lock teeth to be fully engaged by the lock holes. As a result, not only the positions at which the seat can be held is limited but also there is a certain inconvenience in accomplishing a lock up in a seat slide device.

Furthermore, typically, a pair of such slide devices, provided with individual lock devices which are mutually connected for instance by a control cable for simultaneous action thereof, are used for each seat, as a combination of a master seat slide device and a slave seat slide device, to the end of reinforcing the general structure for supporting the seat. And the lock structure for the master seat slide device is directly actuated by the driver or the passenger, as the case may be, and the lock structure of the slave seat slide device is actuated by the actuating force transmitted from the lock structure for the master seat slide device by way of the control cable. However, in such a combination of a pair of seat slide device using two lock structures, simultaneous locking of the two lock devices is sometimes not possible due to the deformation of the rails serving as the main members for the seat slide devices. Since, even when the lock teeth and the lock holes of the master seat slide device are properly aligned for secure engagement therebetween, the lock teeth and the lock holes of the slave seat slide device may not be in proper alignment for secure engagement. This deformation occurs often in the form of diagonal deformation in which the pair of rails extending under the side portions of the seat are mutually displaced along the longitudinal direction whereby the rectangle defined by the two rails and cross members connecting the front and rear ends of the two rails is deformed into a parallelogram shape.

BRIEF SUMMARY OF THE INVENTION

In view of such problems of the prior art, a primary object of the present invention is to provide a lock structure for seat slide device which can lock up at any arbitrarily seat slide position.

Another object of the present invention is to provide a lock structure for seat slide device which can always accomplish a full locking when it is used in a slave seat slide device even in the presence of some deformation between the master and the slave seat slide device.

Yet another object of the present invention is to provide a lock structure for seat slide device which allows light-weight design of the seat slide device.

Yet aother object of the present invention is to provide a lock structure which can lock up at any arbitrary seat slide position yet the play between the lock teeth and the lock holes is minimal.

According to the present invention, such objects are accomplished by providing a lock structure for a seat slide device having a first and a second rail which are parallel to each other and mutually slidable, comprising: a plurality of lock holes provided in the first rail along its longitudinal direction at an equal pitch of P; and a plurality of lock teeth which are hinged to the second rail; the lock teeth being arranged along the longitudinal direction of the second rail at a pitch which is not identical to the pitch of the lock holes.

According to a certain aspect of the present invention, the principle of vernier is utilized and, for instance, the lock holes are provided in the first rail along its longitudinal direction at an equal interval of pitch P; and $n(=2, 3, \ldots)$ number of moveable lock members are hinged to the second rail at a pitch of z so as to be rotatable about a longitudinal axial line thereof; and at least one lock tooth is provided on each of the lock members in a same phase position of the corresponding lock member so as to be engageable and releaseable relative to the lock holes; wherein $P=nz/(n-1)$ and $[z/(n-1)]+x<a$, where x is the width of the lock teeth and a is the width of the lock holes.

If more than one tooth is to be provided in each of the lock members, the lock holes are provided in the first rail along its longitudinal direction at an equal interval of pitch P; $n(=2, 3, \ldots)$ number of moveable lock members are hinged to the second rail at a pitch of z so as to be rotatable about a longitudinal axial line thereof; m number of lock teeth are provided on each of the lock members in a same phase position of the corresponding lock member so as to be engageable and releaseable relative to the lock holes; wherein $P=nz/m(n-1)$ and $[(n-m)z/m(n-1)]+x<a$, where x is the width of the lock teeth, a is the width of the lock holes, $n=2, 3, \ldots$, $m=2, 3, \ldots$, and $n>m$.

Due to the appropriate pitch of the lock holes and the appropriate widths of the lock teeth and the lock holes, the lock teeth of at least one of the lock members can be engaged by the lock holes at any arbitrary seat slide position.

If the plays between the lock holes and the lock teeth are to be reduced it is preferred that $m=n-1$ and/or $(m-1)P+x=z$.

According to another aspect of the present invention, the lock teeth are arranged along the longitudinal direction of the second rail at the pitch of P but are varied phase positions, and, preferably, the lock holes are provided in the first rail along its longitudinal direction at an equal interval of pitch P; $n(=2, 3, \ldots)$ number of moveable lock members are hinged to the second rail at a pitch of mP(m=1, 2, ...) so as to be rotatable about a longitudinal axial line thereof; n number of lock teeth are provided on each of the lock members with a certain phase difference for the teeth of the lock members so as to be individually engageable and releaseable relative to the lock holes; wherein P>a>x+P/n, where x is the width of the lock teeth and a is the width of the lock holes. And, preferably, the phase difference is 360/n.

Again, by this arrangement due to the appropriate pitch of the lock holes and the appropriate widths of the lock teeth and the lock holes, the lock teeth of at least one of the lock members can be engaged by the lock holes at any arbitrary seat slide position.

Furthermore, since the use of such a lock device will permit some diagonal deformation in the seat slide devices or, in other words, the seat slide rails, the requirement of rigidity of the seat slide is reduced and the weight of the seat slide devices can be reduced.

BRIEF DESCRIPTION OF THE DRAWINGS

Now the present invention is described in the following in terms of specific embodiments with reference to the appended drawings, in which.

DESCRIPTION OF THE PREFERRED EMBODIMENTS

Figure 1:
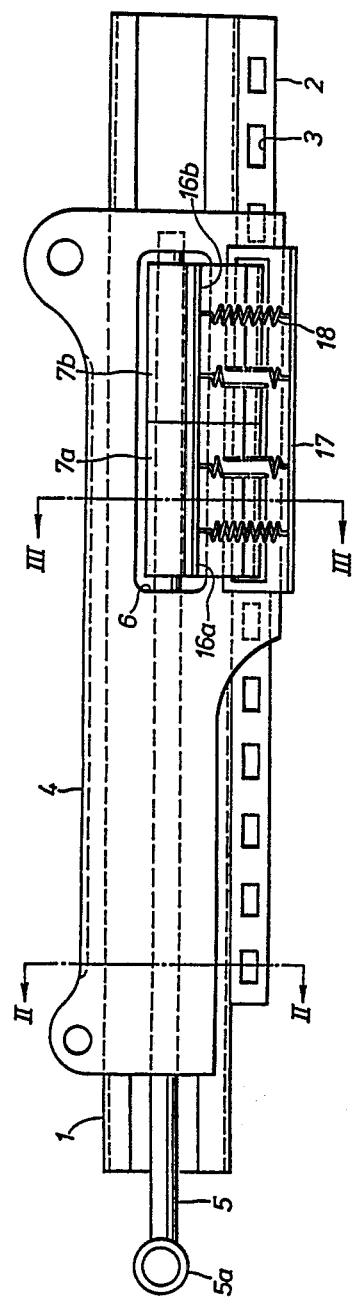
FIG. 1 is a side view of a seat slide device to which the present invention is applied.

FIG. 1 is a side view schematically illustrating the general structure of a seat slide device provided with a lock structure according to the present invention.

Figure 2:
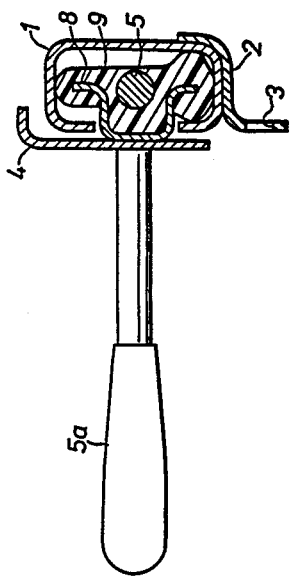
FIG. 2 is a sectional view taken along line II—II of FIG. 1.

A lower rail 1 is fixedly secured to the floor surface of the vehicle by way of brackets which are not shown in the drawings, and an upper rail 4 is fixedly secured to a seat which is also not shown in the drawings. As best shown in FIG. 2, a retaining member 8 having a cross-section in the shape of Greek letter "omega" is fitted to the upper rail 4 so as to be accommodated in the interior of the lower rail 1 which consists of a channel member in such a manner that the upper rail 4 and the lower rail 1 may be mutually freely slidable by way of a sliding member 9 integrally molded over the retaining member 8.

Figure 3:
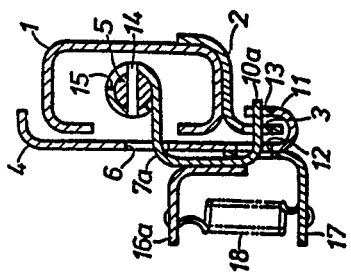
FIG. 3 is a sectional view along line III—III of FIG. 1.

Further, a lock lever shaft 5 is received by the sliding member 9 so as to be rotatable about a central axial line of the sliding member 9. The portion of the lock lever shaft 5 adjacent to a window 6 cut out in the upper rail 4 has a pair of lock members 7a and 7b hinged thereto. As shown in FIG. 3, a pair of pins 14 are passed through the lock lever shaft 5 and fixed thereto, and protruding portions of the pins 14 project into a pair of slots 15 provided in the base ends of the moveable lock members 7a and 7b which are wrapped around the lock lever shaft 5.

A depending piece 2 is fixedly secured to a lower portion of the lower rail 1 and is provided with a plurality of lock holes 3 each having a rectangular shape at equal intervals. As best shown in FIG. 3, the lock members 7a and 7b hinged to the lock lever shaft 5 protrude outwardly from the window 6 of the upper rail 4 and, after being bent downwardly and then inwardly, are passed through a guide hole 12 provided in a lower portion of the upper rail 4, the lock holes 3 provided in the depending piece 2 and a notch 13 provided in a free end of a curved portion 11 which is formed by bending upwardly a lower portion of the upper rail in the shape of letter "U", in that order. As is described in greater detail hereinafter, the free ends of the lock members 7a and 7b are provided with at least one lock tooth 10a.

A pair of L-shaped brackets 16a and 16b are fixedly attached to the portions of the lock members 7a and 7b protruding outwardly from the upper rail 4 and another L-shaped bracket 17 is fixedly attached to the lower portion of the upper rail 4 so as to protrude outwardly and oppose the brackets 16a and 16b which are attached to the lock members 7a and 7b. A pair of tension coil springs 18 are engaged between the brackets 16a and 16b and the bracket 17.

Therefore, by turning the lock lever shaft 5 in clockwise direction in the sense of FIG. 3 with its handle knob 5a, with the pins 14 fixed to the lock lever shaft 5 engaging the edges of the slots 15 provided in the lock members 7a and 7b, the lock members 7a and 7b are rotated in clockwise direction against the spring force of the tension coil springs 18. Thus, after turning the lock lever shaft 5 in clockwise direction in the sense of FIG. 3 and adjusting the seat slide position, by releasing the lock lever shaft 5 under the spring force of the coil springs 18 and fitting the lock teeth 10a into the lock holes 3, the seat will be secured to the newly selected position. In this connection, it should be noted that even if none of the lock teeth 10a and 10b of the lock members 7a and 7b entered the lock holes 3, the lock members 7a and 7b would be able to remain in the state in which the tension coil springs 18 are stretched even after the lock lever shaft 5 has returned to the position shown in FIG. 3.

FIGS. 4a to 4d are illustrative views showing the positional relationships between the lock teeth 10a and 10b and the lock holes 3 according to a first embodiment of the present invention as it is applied to the seat slide device shown in FIGS. 1 to 3.

The lock holes 3 are arranged at an equal pitch of P and each of the lock holes has a width a. Meanwhile, the moveable lock members 7a and 7b are arranged at a pitch of $z = P/2$ along the longitudinal axial line thereof. Each of the moveable lock members 7a and 7b is provided with a lock tooth 10a and 10b at a same phase position and each of the lock teeth 10a and 10b has a width x. Therefore, the pitch of the lock teeth is also $z = P/2$. According to the present embodiment, the lock teeth 10a and 10b are provided in the center of the corresponding lock members 7a and 7b, but may be provided in the right ends, left ends or other parts of the corresponding lock members as long as they are in the same phase positions.

Figure 4A:
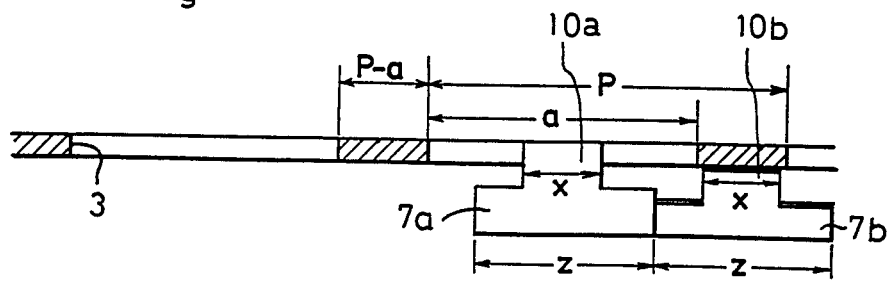
FIGS. 4a to 4d are schematic views illustrating the action of a first embodiment of the lock structure according to the present invention in which two lock members are used.
Figure 4B:
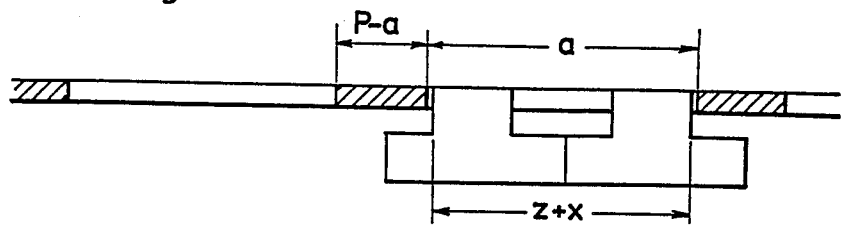
Figure 4C:
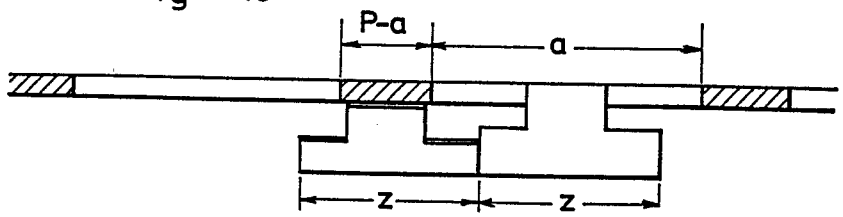

Since the lock teeth 10a and 10b are provided at half the pitch of the lock holes 3 or, in other words, $$P = 2z \qquad (1)$$

and the width a of the lock holes 3 and the width x of the lock teeth are so determined that $$z + x < a \text{ (or } -a < -x - z) \qquad (2)$$

it is possible for a pair of lock teeth to enter a same lock hole at the same time as best shown in FIG. 4b.

And, in regards to the portion between two neighboring lock holes, from equation (1) and inequality (2) the following relation holds:

$$P - a = 2z - a < z - x \qquad (3)$$

Figure 4D:
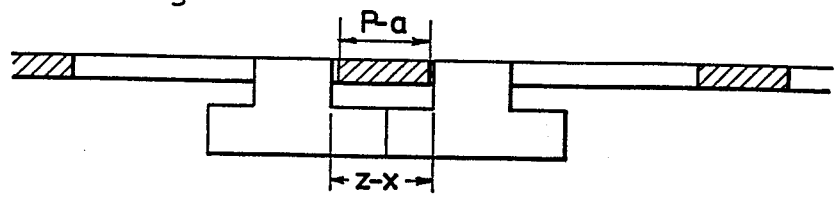

Therefore, as shown in FIG. 4d, it is possible for the two lock teeth to enter different lock holes with the portion between the two neighboring lock holes being received by the gap between the lock teeth since the width of the portion between the two neighboring lock holes P—a is smaller than the width of the gap between the two neighboring lock teeth a—x.

Thus, as shown in FIGS. 4a to 4d, when either one of the lock teeth is in engagement with the portion between the two neighboring lock holes, the other tooth safely enters one of the lock holes, and the lock tooth of at least one of the lock member can enter one of the lock holes at all time.

FIGS. 5a to 5f shows a second embodiment in which one lock tooth 10a, 10b or 10c is provided on each of three lock members 7a, 7b and 7c and, in the same manner as in the previous case, the lock holes 3 are provided at an equal pitch P while each of the lock holes has the width a. The moveable lock members 7a, 7b and 7c are arranged at an equal pitch of z and a lock tooth 10a, 10b or 10c is provided on the corresponding lock member at the same phase position while the width of each lock tooth is x.

Here, the pitch z of the moveable lock member 7a, 7b and 7c along the longitudinal direction is so selected that the following relation holds:

$$P = 3z/2 \qquad (4)$$

Therefore, since the lock teeth are provided at the same phase positions, the pitch of the lock teeth 10a, 10b and 10c is also z. In this embodiment also, the lock teeth 10a, 10b and 10c may not be provided in the center of the corresponding lock members but may also be provided on the right edge, the left edge or any other position of the corresponding lock members as long as they are in the same phase positions.

Further, the width a of the lock holes 3 and the width x of the lock teeth x are determined so that $$(z/2) + x < a \text{ or } (z/2) - a < -x \qquad (5)$$

Figure 5A:
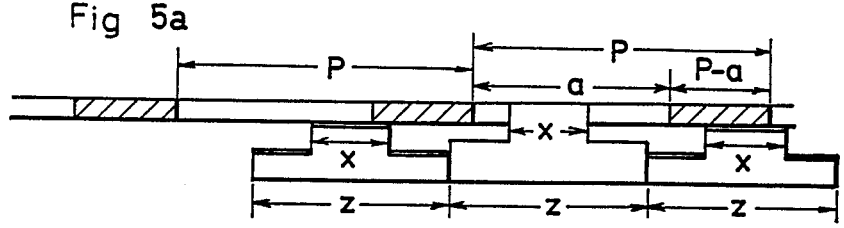
FIGS. 5a to 5f are schematic views illustrating the action of a second embodiment of the lock structure according to the present invention in which three lock members are used.
Figure 5B:
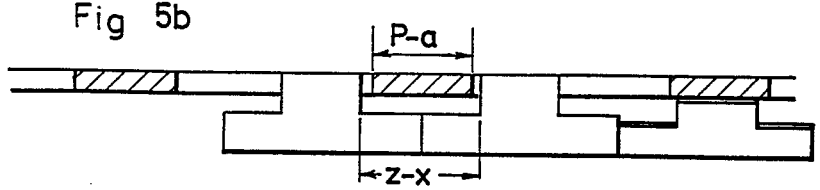
Figure 5C:
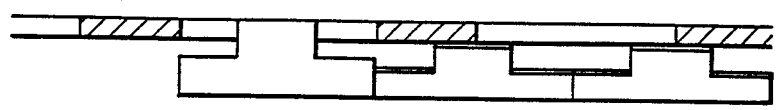

Therefore, $$P - a = (3z/2) - a < z - x \qquad (6)$$

and, since the gap between two neighboring teeth z—x is greater than the width P—a of the portion between two neighboring lock holes, it is possible for the two neighboring lock teeth to enter different lock holes with the portion between the two neighboring lock holes being received by the gap between the two neighboring lock teeth, as shown in FIG. 5b.

Figure 5D:
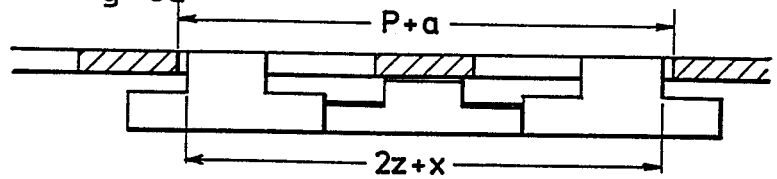
Figure 5E:
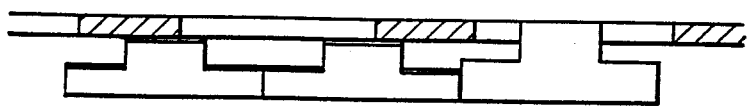
Figure 5F:
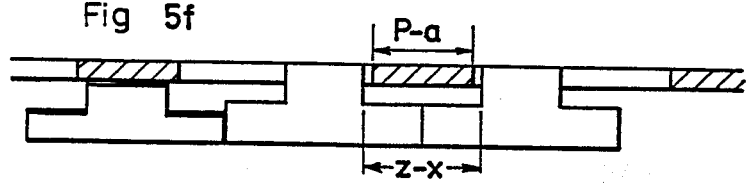

Now the condition under which the lock teeth of the frontmost and rearmost lock member can enter two neighboring lock holes as shown in FIG. 5d is considered. From equation (4) and inequality (5), it can be seen that such a condition really exists as follows:

$$P + a = (3z/2) + a > 2z + x \qquad (7)$$

Therefore, as shown in FIGS. 5a to 5f, when the lock tooth of one moveable lock member or the lock teeth of two moveable lock member are engaged to the portion between two neighboring lock holes, the lock teeth of the remaining lock members enter the lock holes and the lock tooth of at least one of the lock members can enter the corresponding lock hole.

Figure 6A:
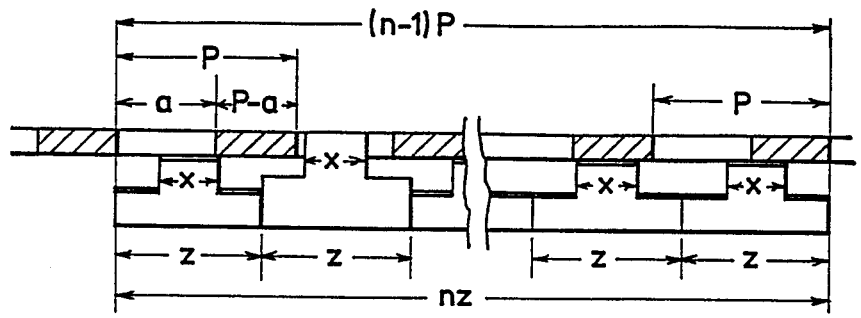
FIGS. 6a to 6c are schematic views illustrating the action of a third embodiment of the lock structure according to the present invention in which n lock members are used.
Figure 6B:
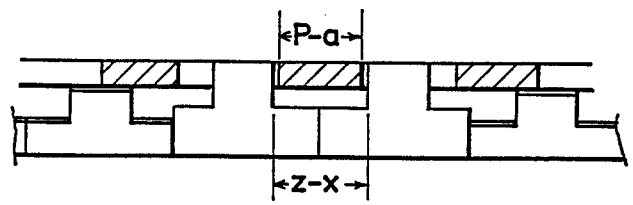
Figure 6C:
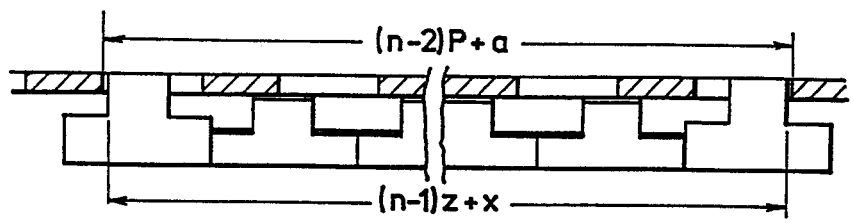

To the end of expanding the above described concept to a more general case, it is now assumed that there are n moveable lock members and one lock tooth is provided in each of the moveable lock members at the same phase positions (FIGS. 6(a) to 6(c)) as a third embodiment of the present invention. In this case, it is also assumed that the pitch of the lock holes is P, the pitch of the moveable lock members is z, the width of each of the lock teeth is x, and the width of each of the lock holes is a.

Now, if $$P = nz/(n-1) \quad (8)$$

and $$[z/(n-1)] + x < a \text{ or } -a < -x - [z/(n-1)] \quad (9)$$

the condition under which the portion between two neighboring lock holes can be received by the gap between two neighboring lock teeth will be confirmed as follows (Refer to FIG. 6(b)):

$$\begin{aligned} P - a &= [nz/(n-1)] - a \quad (10) \\ &< [nz/(n-1)] - [z/(n-1)] - x \\ &= z - x \end{aligned}$$

Then, the condition under which the external dimension of n lock teeth $(n-1)z + x$ can be accommodated within the width between the external edges of the lock holes $(n-1)P + a$ can be examined and confirmed as follows (FIG. 6c):

$$\begin{aligned}{} [(n-2)P] + a &= [n(n-2)z/(n-1)] + a \quad (11) \\ &> [n(n-2)z/(n-1)] + [z/(n-1)] + x \\ &= (n-1)z + x \end{aligned}$$

In the intermediate cases between the cases in which the above described two conditions hold, either one of the lock teeth can always be received by one of the lock holes according to the principle of vernier which is utilized in vernier calipers and other measuring instruments, and at least one of the lock teeth can be received by one of the lock holes at all time in any case.

Figure 7A:
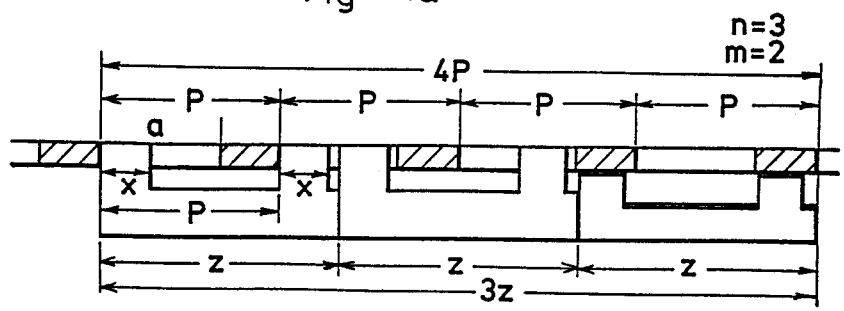
FIGS. 7a and 7b are schematic views illustrating a fourth and fifth embodiment of the lock device according to the present invention in which a pair of lock teeth and three lock teeth are provided in each lock member, respectively.
Figure 7B:
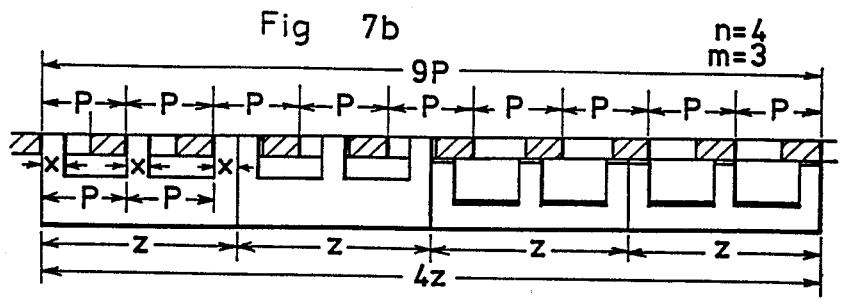

FIGS. 7a and 7b shows a fourth and a fifth embodiment of the present invention in each of which a plurality of lock teeth are formed on each moveable lock member. In the case of the fourth embodiment shown in FIG. 7a, two moveable lock members are provided and a pair of lock teeth are formed in each of the lock members while, in the case of the fifth embodiment of FIG. 7b, four moveable lock members are provided and three lock teeth are formed in each of the lock members.

The pitch of the lock teeth on each of the lock members is equal to the pitch of the lock holes. Therefore, in these cases, the lock teeth provided in each of the lock members will be received by the lock holes at the same time but, since the pitch of the lock holes and the pitch of the lock members disagree, the lock teeth of at least one of the lock members will be received by the corresponding lock holes irrespective of the longitudinal position of the moveable lock members in the same manner as in the previous embodiments.

To the end of expanding the above described concept to an even more general case, it is now assumed that there are n moveable lock members and m lock teeth are provided in each of the moveable lock members at the same phase positions as a sixth embodiment. In this case, it is also assumed that the pitch of the lock holes is P, the pitch of the moveable lock members is z, the width of each of the lock teeth is x, and the width of each of the lock holes is a. And, the lock teeth are separated into m lock teeth and the lock teeth on each of the lock members are arranged at the pitch of P.

Now, a and x are selected so that the following relationships hold:

$$P = nz/m(n-1) \quad (12)$$

and $$[(n-m)z/m(n-1)] + x < a \quad (13)$$

where $m, n = 2, 3, \ldots$

Figure 8A:
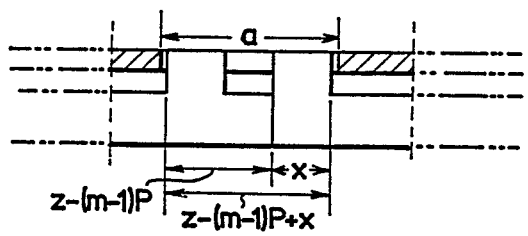
FIGS. 8a and 8b are schematic views illustrating a sixth embodiment of the lock device according to the present invention in which n number of lock members each having m number of lock teeth are used.
Figure 8B:
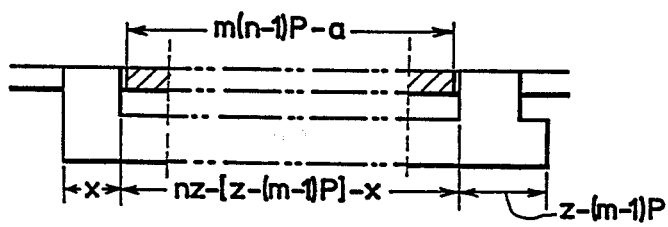

Now the conditions under which the two lock teeth located at the longitudinal external ends of two neighboring lock members can be received by a same lock hole (FIG. 8a) is examined in the following:

$$\begin{aligned} z - (m-1)P + x &= z - [n(m-1)z/m(n-1)] + x \quad (14) \\ &= [(n-m)z/m(n-1)] + x \\ &< a \end{aligned}$$

And, it can be seen that such a condition indeed exists.

Then, the condition under which the external dimension of the two lock teeth located on the outermost lock members is greater than the distance between the inner edges of $m(n-1)$ consecutive lock holes is examined in the following:

$$m(n-1)P - a < (n-1)z - x + (m-1)P \quad (15)$$

When this inequality is examined in a slightly modified form, $$m(n-1)P - (n-1)z + x - (m-1)P < a \quad (16)$$

the left hand side of inequality (16) is:

$$\begin{aligned} \text{(left hand side of inequality (16))} &= nz - nz + z + x - \\ &\quad [n(m-1)z/m(n-1)] \\ &= [(n-m)z/m(n-1)] + x \\ &< a = \\ &\text{(right hand side of inequality (16))} \end{aligned}$$

Thus, it can be see that this condition can also be satisfied.

According to this embodiment also, when the lock teeth of either one or two of the lock members are engaged to the portions between two neighboring lock holes, at least one of the remaining lock teeth is received by the corresponding lock hole irrespective of the longitudinal position of the moveable lock members. It is to be noted that according to this embodiment, since m lock teeth are provided on each lock member, the lock teeth provided in the same lock member will be received by neighboring m lock holes.

Now, the possible number of teeth which may be provided on each lock member is considered in the following. From inequality (14)

$$\frac{(n-m)}{m(n-1)} < \frac{a-x}{z} \quad (17)$$

Since the right hand side of this inequality must be positive and $n > m$, and since $(a - x)$ corresponds to the maximum value of the play between the lock holes and the lock teeth, the play may be minimized by setting $n = m + 1$ or $$m = n - 1 \quad (18)$$

and by increasing the value of n to a maximum possible value.

Further, by setting $$(m-1)P + x = z \tag{19}$$

the edges of the lock members will coincide with the external edges of the lock teeth as was the case in the embodiment shown in FIG. 7b, the width of the lock teeth may be maximized and, hence, their mechanical strength may be maximized.

FIGS. 9a to 9d are illustrative views showing the positional relationships between the lock teeth 10a and 10b and the lock holes 3 according to a seventh embodiment of the present invention as applied to the seat slide device shown in FIGS. 1 to 3. The lock teeth 3 each have a width a and are arranged at an equal pitch of P. The lock members 7a and 7b are likewise arranged at the pitch of P and each of the lock teeth has a width x. Further, the lock teeth 10a and 10b are so arranged that they have a phase difference of 180 degrees or, in other words, are mutually offset by P/2. Further, a and x are determined so that the following inequalities hold:

$$P > a > x + P/2 \tag{20}$$

$$x < P/2 \tag{21}$$

Figure 9A:
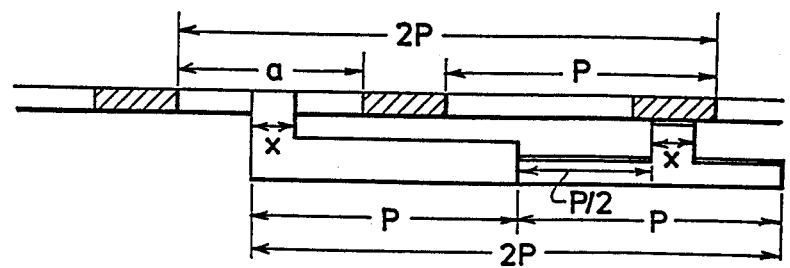
FIGS. 9a to 9d are schematic views illustrating the action of a seventh embodiment of the lock structure according to the present invention using two moveable lock members each having a single lock tooth.
Figure 9B:
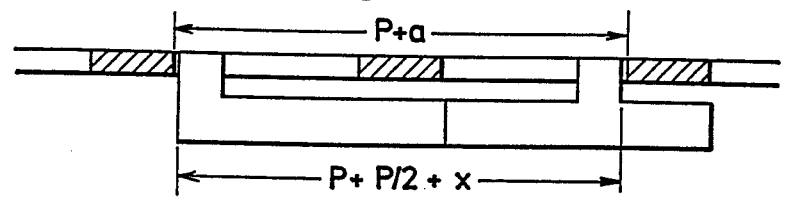
Figure 9C:
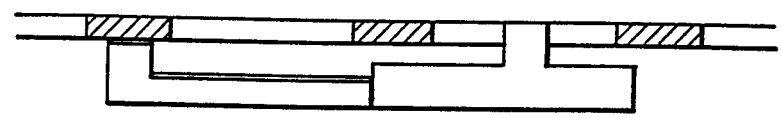

Therefore, in the case of the situation shown in FIG. 9b, the difference between the distance between the external edges of two neighboring lock holes $P + a$ and the distance between the external edges of two neighboring lock teeth $2P - P/2 + x (= 3P/2 + x)$ can be obtained as follows:

$$P + a - 3P/2 - x = a - x - P/2$$

Therefore, from equation (20) the right hand side of the above equation is greater than zero and it can be seen that the condition for the lock teeth to be received by the lock holes is satisfied.

Figure 9D:
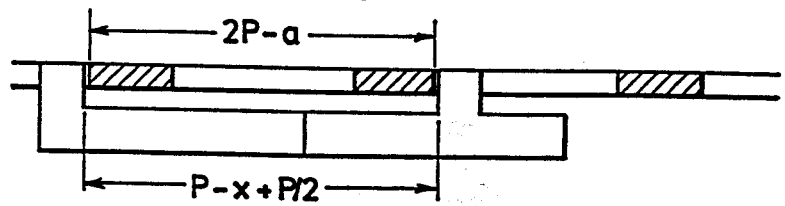

In the case of the situation shown in FIG. 9d, when the difference between the distance between the inner edges of the two lock holes located to the right and left a lock hole $2P - a$ and the distance between the inner edges of the two neighboring lock teeth $(3P/2) - x$ is examined, one obtains $$2P - a - (3P/2) + x = -a + x + P/2$$

Therefore, from equation (20) the right hand side of the above equation is greater than zero and it can be seen that the condition for the lock teeth to be received by the lock holes is satisfied.

From above, it can be seen that at least either one of the lock teeth 10a or 10b will fit into one of the lock holes, as shown in FIGS. 9a to 9d, irrespective of the positions of the lock teeth 10a and 10b. It is to be noted that inequality (21) determines the condition under which the lock teeth may be physically realized.

FIGS. 10a to 10f show an eighth embodiment in which three moveable lock members, each having a single lock tooth 10a, 10b or 10c, are used. The lock holes 3 have a width a and are arranged at an equal pitch of P. The lock members are also arranged at the pitch of P and each of the lock teeth has a width x. Further, the lock teeth 10a, 10b and 10c are so arranged that they are provided with a mutual phase difference of 120 degrees or, in other words, they are offset to each other by P/3.

According to this embodiment, a and x are determined so that $$a > x + P/3 \tag{22}$$

and $$x < P/3 \tag{23}$$

hold.

Figure 10A:
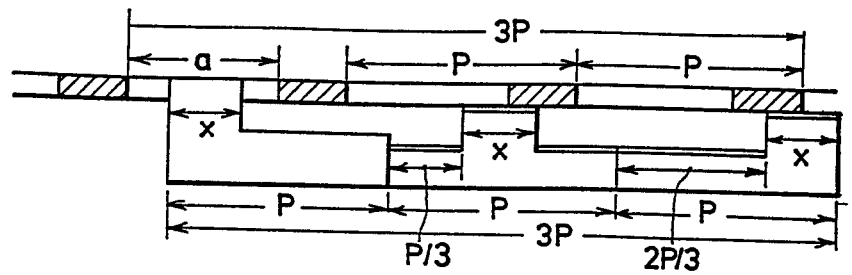
FIGS. 10a to 10f are schematic views illustrating the action of an eighth embodiment of the lock structure according to the present invention using three moveable lock members each having a single lock tooth.
Figure 10B:
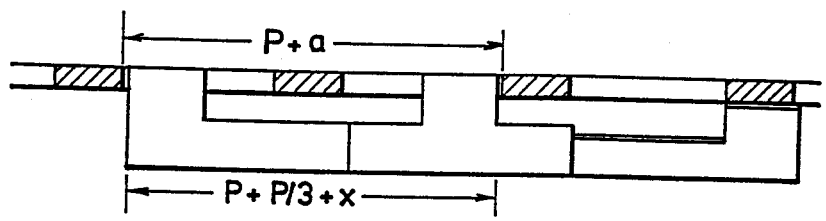
Figure 10C:
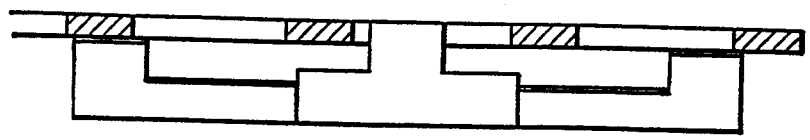
Figure 10D:
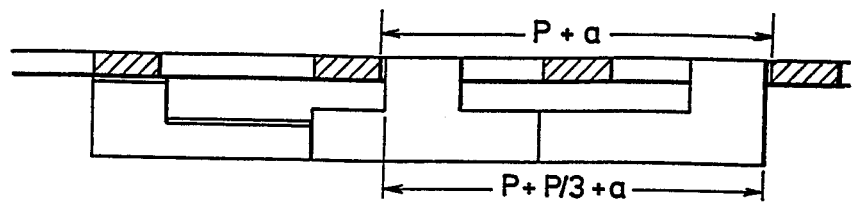
Figure 10E:
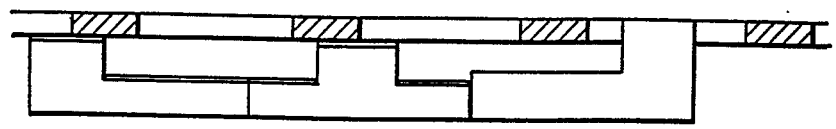

Therefore, when the difference between the distance between the external edges of two neighboring lock holes $P + a$ and the distance between the external edges of two neighboring lock teeth $P + P/3 + x (= 4P/3 + x)$ is examined in a situation as shown in FIG. 10b, one obtains $$P + a - 4P/3 - x = a - P/3 - x$$

Therefore, from equation (22) the right hand side of the above equation is greater than zero and it can be seen that the condition for the lock teeth to be received by the lock holes is satisfied.

Figure 10F:
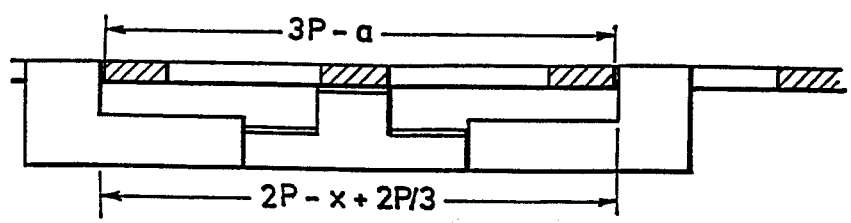

In the situation shown in FIG. 10f, when the difference between the distance between the inner edges of two holes displaced from each other by two lock holes $3P - a$ and the distance between the inner edges of two mutually neighboring lock teeth $2P - x + 2P/3$ or $(4P/3) - x$ is examined, one can obtain $$3P - a - (4P/3) + x = -a + x + P/3$$

Therefore, from equation (22) the right hand side of the above equation is smaller than zero and it can be seen that the condition for the lock teeth to be received by the lock holes is satisfied.

From above, it can be seen that at least either one of the lock teeth 10a, 10b or 10c will fit into one of the lock holes 3, as shown in FIGS. 10a to 10d, irrespective of the positions of the lock teeth 10a, 10b and 10c. It is to be noted that inequality (23) determines the condition under which the lock teeth may be physically realized.

Figure 11A:
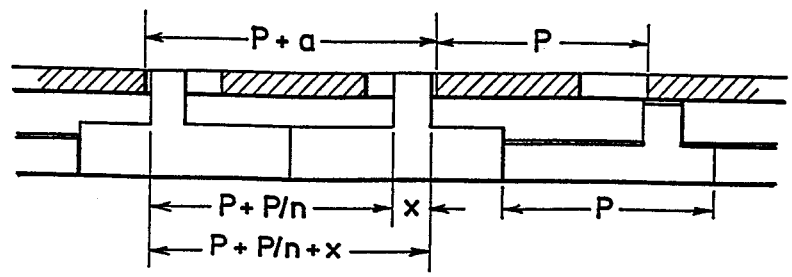
FIGS. 11a and 11b are schematic views illustrating the action of a ninth embodiment of the lock structure according to the present invention using n number of moveable lock members each having a single lock tooth.
Figure 11B:
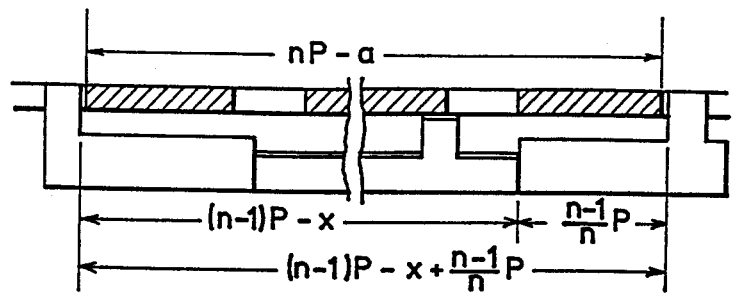

Now, to the end of expanding the above described concept to a more general case, in a ninth embodiment shown in FIGS. 11a and 11b, it is assumed that n moveable lock members, each having a single lock tooth, are used. Then, by offsetting the positions of the lock teeth each by P/n, or 180/n degrees in terms of phase difference, and setting $$P > a > x + P/n \tag{24}$$

and $$x < P/n \tag{25}$$

it is possible to have at least one of the lock teeth fitted into one of the lock holes as is proved hereinafter.

Specifically, when the difference between the distance between the external edges of two mutually neighboring lock holes $P + a$ and the distance between the external edges of two mutually neighboring lock teeth $P + P/n + x (= (n+1)P/n + x)$ in the situations as shown in FIG. 11a is examined as a critical conditon, one can obtain $$P + a - (n+1)P/n - x = a - x - P/n$$

Therefore, from equation (24) the right hand side of the above equation is greater than zero and it can be seen that the condition for the lock teeth to be received by the lock holes is satisfied.

Specifically, when the difference between the distance between the internal edges of two lock holes spaced from each other by two lock holes nP—a and the distance between the inner edges of two mutually neighboring lock teeth $(n-1)P-x+(n-1)P/n$ or $[(n+1)P/n-x]$ in a situation as shown in FIG. 11b is examined as another critical condition, one can obtain $$nP-a-[(n+1)P/n]+x=-a+x+P/n$$

Therefore, from equation (24) the right hand side of the above equation is smaller than zero and it can be seen that the condition for the lock teeth to be received by the lock holes is satisfied. It is to be noted that inequality (25) determines the condition under which the lock teeth may be physically realized.

From above, it can be seen that at least either one of the lock teeth 10a, 10b or 10c will fit into one of the lock holes 3, as shown in FIGS. 11a and 11b, irrespective of the positions of the lock teeth 10a, 10b and 10c.

Figure 12A:
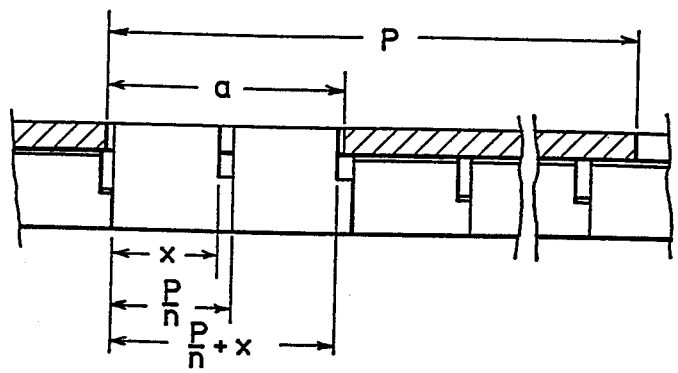
FIGS. 12a and 12b are schematic views illustrating the action of a tenth embodiment of the lock structure according to the present invention using n number of moveable lock members each having a single lock tooth.
Figure 12B:
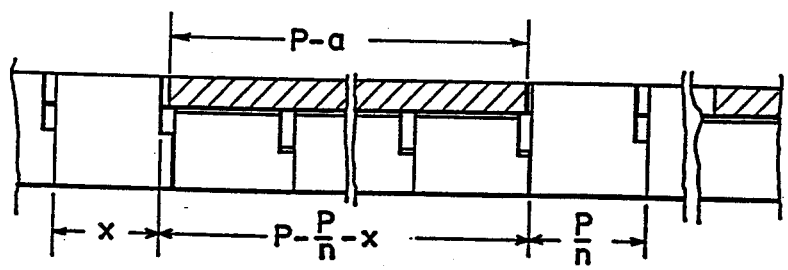

FIGS. 12a and 12b shows a tenth embodiment of the present invention in which the pitches of the lock members as well as the lock teeth are set to P/n while the pitch of the lock holes is set to P as opposed to the previous embodiment in which the pitch of the lock members was set to P.

In this case also, it is examined whether two neighboring lock teeth can be received by a same lock hole at the same time or not (FIG. 12a), or whether the first and the n-th lock tooth can be received by two mutually adjacent lock holes or not (FIG. 12b) as two important critical conditions.

In the case of the situation shown in FIG. 12a, from $$a>P/n+x$$

$$a-x>P/n$$

In the case of the situation shown in FIGS. 12b, from $$P-a<P-P/n-x$$

$$a-x>P/n$$

And, therefore, it can be seen that it is sufficient if inequality (24) holds. Inequality (25) will be necessary as the condition under which two neighboring teeth will not interfere each other.

Figure 13:
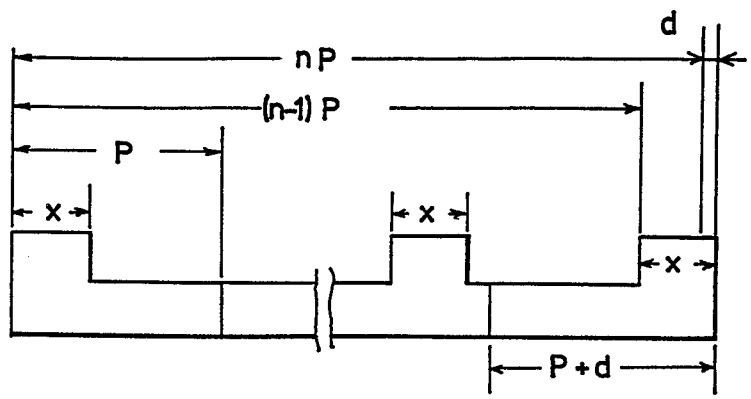
FIGS. 13 and 14 are schematic views illustrating special cases for evaluating the conditions under which the lock teeth are physically realizable.

However, the condition of inequality (25) may be eliminated. Specifically, when this condition is not satisfied, the n-th lock tooth exceeds the edge of the corresponding lock member in the ninth embodiment shown in FIGS. 11a and 11b, but this inconvenience can be avoided by increasing the width of the n-th lock member by $d=x-P/n$ as shown in FIG. 13.

Figure 14:
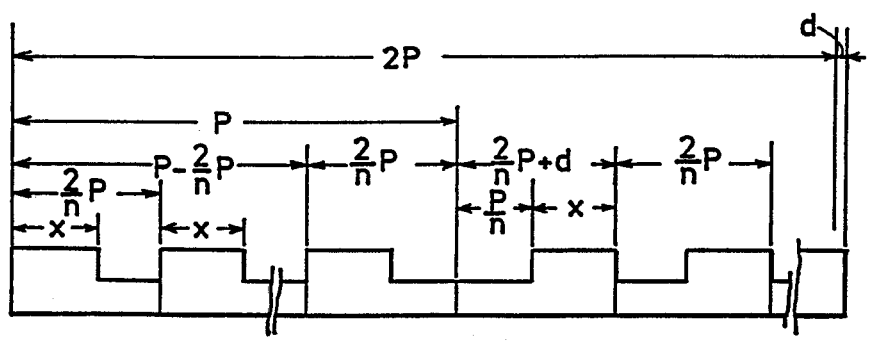

In the case of the fourth and the fifth embodiment shown in FIGS. 12a and 12b, by displacing the odd lock teeth and the even lock teeth over the distance of 2p+d as shown in FIG. 14 for the purpose of avoiding the interference between neighboring lock teeth, the condition of inequality (25) may be eliminated.

Figure 15:
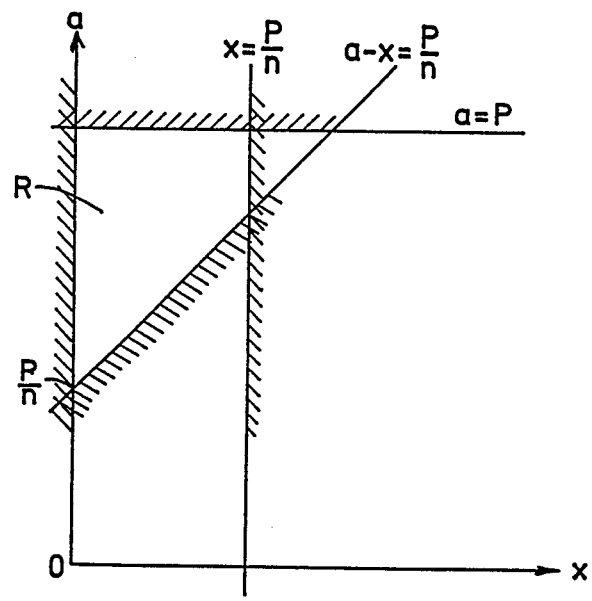
FIG. 15 is a graph showing the range of combinations of the values of a and x which will allow at least one of the lock teeth to be received by the corresponding lock hole in regards to the embodiments shown in FIGS. 11a, 11b, 12a and 12b.

FIG. 15 is a graph showing the range of the combinations of the width of the lock holes a and the width of the lock teeth x which satisfy the conditions for fitting the lock teeth into the lock holes. By selecting a and x from the range R in which inequalities (24) and (25) hold and a<x, the lock teeth may be fitted into the lock holes at any position. A play of (P/n) exists between the lock teeth and the lock holes, but this play can be reduced by increasing the number n. Further, as described previously, it is possible to eliminate the condition of inequality (25) depending on the situation.

Figure 16:
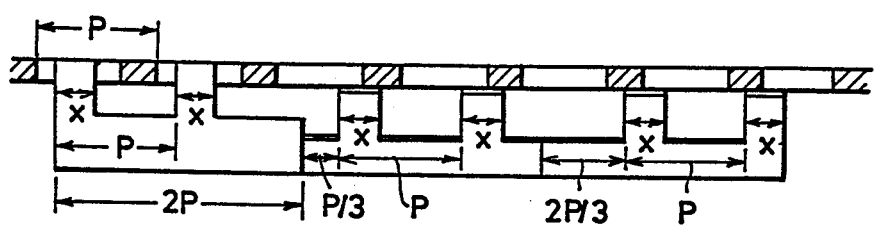
FIG. 16 is a schematic view illustrating the action of an eleventh embodiment of the lock structure according to the present invention using three moveable lock members each having two lock teeth.

To the end of expanding the above described concept to a more general case, it is assumed that n lock members, each having m lock teeth, are used. since this case is no different from the case of using m lock members as will be seen from the case of m=2 and n=3 shown in FIG. 16 as an eleventh embodiment, the above concept directly applies to this case also.

This invention can be applied to a lock structure for a normal seat slide device and it is particularly advantageous when it is applied to one of the two lock structures for a pair of seat slide devices provided for a single seat because it can assure satisfactory engagement even when a diagonal distortion has developed between the two seat slide devices.

Thus, according to the present invention, since the lock teeth may be received by the lock holes at any arbitrary position simply by providing a plurality of mutually separated lock members on the lock lever shaft in the mannner of hinges, the necessity for fine adjustment in changing the slide position of the seat can be eliminated. In particular, since a satisfactory engagement is assured even when there is a diagonal distortion between the two seat slide rail device for a seat according to this invention, some diagonal distortion is allowed and the weight of the seat slide devices can be reduced through alleviation of the requirement for the rigidity of the structure.

Although the present invention was described in terms of specific embodiments, the present invention is not limited thereby. For instance, the concept of the present invention includes the cases in which the dimensional relationships between the lock holes and the lenock teeth are reversed in relation with the above described embodiments.

What we claim is:

1. A lock structure for a seat slide device having a first and a second rail which are parallel to each other and mutually slidable, comprising:
   a plurality of lock holes provided in the first rail along its longitudinal direction at an equal pitch of P;
   at least three lock members, each having a lock tooth at a same phase position with respect to a lock tooth on each of the other lock members, which lock members are hinged to the second rail at an equal pitch z so as to have the lock teeth independently engageable with the lock holes and jointly releasable from the lock holes; and
   wherein $P=nz/(n=1)$ and $P/n+x<a$, where n is the number of the lock members, x is the width of each lock tooth and a is the width of each lock hole.

2. A lock structure for a seat slide device having a first and a second rail which are parallel to each other and mutually slidable, comprising:
   a plurality of lock holes provided in the first rail along its longitudinal direction at an equal pitch of P;
   at least three lock members, each having m number of lock teeth at same phase positions with respect to said lock teeth on each of the other lock members, which lock members are hinged to the second rail at an equal pitch z so as to have the lock teeth independently engageable with the lock holes and jointly releasable from the lock holes; and wherein $P = nz/m(n-1)$ and $[(n-m)z/m(n-1)] + x < a$, where n is the number of the lock members, x is the width of each lock tooth, a is the width of each lock hole, $m = 2, 3, \ldots$ and $n > m$.

3. The lock structure for a seat slide device as defined in claim 2, wherein $m = n - 1$.

4. The lock structure for a seat slide device as defined in claims 2 or 3, wherein $(m-1)P + x = z$.

5. A lock structure for a seat slide device having a first and a second rail which are parallel to each other and mutually slidable, comprising:

a plurality of lock holes provided in the first rail along its longitudinal direction at an equal pitch of P;

at least two longitudinally spaced lock members, each having m number of lock teeth at varied phase positions with respect to said lock teeth on each of the other lock members, which lock teeth are hinged to the second rail at an equal pitch of mP so as to have at least two of the lock teeth independently engageable with different lock holes in a locked condition and jointly releasable from the lock holes; and wherein $P > a > x + P/n$ where x is the width of each lock tooth, a is the width of each lock hole, $m = 1, 2, 3, \ldots$ and $n > m$.

6. The lock structure for a seat slide device as defined in claim 5, wherein the phase difference is $360/n$ degrees.

7. The lock structure for a seat slide device as defined in claims 5 or 6, wherein $x < P/n$.

* * * * *